United States Patent Office

3,789,022
Patented Jan. 29, 1974

3,789,022
CATALYST FOR OXIDATION OF HYDROCARBONS AND CARBON MONOXIDE
Barry A. Schenker, Warrensville Heights, Irving Malkin, University Heights, and Kirman Taylor, Painesville, Ohio, assignors to Diamond Shamrock Corporation, Cleveland, Ohio
No Drawing. Filed Aug. 19, 1971, Ser. No. 173,245
Int. Cl. B01j 11/06
U.S. Cl. 252—462       3 Claims

ABSTRACT OF THE DISCLOSURE

An improved catalyst for oxidation of hydrocarbons and carbon monoxide is prepared by depositing on an alumina support layers of oxides of copper, cerium and chromium. Enhanced catalyst activity is obtained when cerium oxide is applied as the middle layer. Catalytic activity is further enhanced by applying the copper oxide layer first and maintaining the molar ratio of copper to chromium greater than one.

BACKGROUND OF THE INVENTION

(1) Field of the invention

This invention relates to an improved catalyst. More particularly, this invention relates to a catalyst for treatment of exhaust gases from internal combustion engines to remove noxious components therefrom, to a process for preparing the improved catalyst and to a process for using the catalyst in catalytic purification of exhaust gases from internal combustion engines.

(2) Description of the prior art

The noxious components in exhaust gases emitted by internal combustion engines are regarded as being one of the primary causes of air pollution and smog. Catalytic oxidation of the exhaust gases has been proposed as a method for elimination of these noxious components. In this method, exhaust gases, together with atmospheric oxygen, are passed through a catalyst bed wherein noxious components such as hydrocarbons and carbon monoxide are oxidized to carbon dioxide and water.

Development of a catalyst for the oxidation of hydrocarbons and carbon monoxide in exhaust gases presents numerous problems. The catalyst must be effective over a wide range of temperatures, i.e., temperatures as low as 200° C. and as high as 900° C. Further, the catalyst must retain its activity for extended periods of time under adverse conditions.

The literature reports that copper chromite is a useful catalyst for the oxidation of carbon monoxide and hydrocarbons. Use of copper chromite in conjunction with other metal oxides such as cerium oxide is described in U.S. Pat. 3,230,034, Stiles, patented Jan. 18, 1966. A catalyst prepared by depositing a layer of cerium oxide and then a layer of copper oxide on an alumina carrier is described in U.S. Pat. 3,226,340, Stephens et al., patented Dec. 28, 1965.

SUMMARY OF THE INVENTION

We have found that by depositing layers of oxides of copper, cerium and chromium on an alumina carrier enhanced catalytic activity in the oxidation of carbon monoxide and hydrocarbons can be obtained when cerium oxide is aplied as the middle layer. Furthermore, we have found that catalytic activity is greatly enhanced when copper oxide is applied as the first layer, cerium oxide as the second layer, chromium oxide as the third layer and the molar ratio of copper to chromium is greater than one.

DESCRIPTION OF THE PREFERRED EMBODIMENTS

The catalyst of this invention is a copper oxide-cerium oxide-chromium oxide catalyst wherein layers of these oxides have been deposited on an alumina oxide carrier or support in a specific order. For example, a useful catalyst can be prepared using the following procedure:

(1) Mixing an alpha alumina monohydrate, water and a peptizing agent to obtain a doughy mass;

(2) Extruding the doughy mass to obtain an extrudate in the form of a shape;

(3) Drying the extrudate at about 95° C. for about 4 to about 16 hours;

(4) Calcining the dried extrudate to about 600° C. to obtain an activated alumina carrier;

(5) Applying a solution of a copper salt to the carrier and then calcining the salt in situ to form a copper oxide layer on the carrier;

(6) Applying a solution of a cerium salt to the carrier and then calcining the salt in situ to form a cerium oxide layer on the carrier; and (7) Applying a solution of a chromium salt to the carrier and then calcining the salt in situ to form a chromium oxide layer on the carrier to obtain the desired copper oxide-cerium oxide-chromium oxide catalyst.

The alumina oxide carrier can be in any convenient physical form or shape, such as a powder, sphere, granule, pellet, extrudate, or honeycomb structure through which passages are provided for the flow of exhaust gases such as the structure described in U.S. Pat. 3,112,184, Hollenbach, issued on Nov. 26, 1963. Starting material for the carrier can be poorly crystallized boehmite, AlO(OH), or gel-type alpha alumina monohydrate, also known as pseudo-boehmite having a loss on ignition between 10% and 30% by weight and of high purity. Alpha alumina monohydrate may be obtained in a natural state such as from French bauxites or it may be produced by the decomposition of alpha or beta alumina trihydrates in an autoclave by the action of steam at 200° to 300° C. or it may be prepared by the hydrolysis of an aluminum alkoxide. Beta alumina monohydrate or alpha or beta alumina trihydrate may also be used as a starting material for the carrier.

If the starting material is alpha alumina monohydrate, it can be mixed with water and a peptizing agent. Acids such as nitric acid, hydrochloric acid and acetic acid are suitable acids for use as peptizing agents for the alumina. The resulting doughy mass of alumina, water and peptizing agent can be extruded and dried or extruded, formed into spheres or other shapes, and dried. The shaped article can be dried at any temperature below 110° C. It can be dried at ambient temperature. A drying temperature of 95° C. is often used. After drying, the shaped article is calcined at 500° to 600° C. for 3 or more hours. This treatment activates the alumina, converting it to a transition alumina.

Another technique for preparing a useful alumina carrier is to rapidly activate a Bayer hydrate (alpha alumina trihydrate) by heating at between 400° and 800° C. During this process, formation of boehmite and its decomposition products is reduced so the activated alumina is essentially beta alumina. Carrier spherules of varying size can be obtained by taking advantage of the tendency of the alumina to rehydrate, whereby the pore volume and the hardness of the particles are increased. These particles are then calcined at 400° C. The final product has a loss on ignition of 2 to 5% by weight, a specific surface between 300 and 350 m.$^2$/g. and a pore volume of about 0.4 cm.$^3$/g. See French Pat. 1,077,163, Pechiney, Mar. 25, 1953.

Another type of useful alumina carrier is prepared by mixing a suitable alumina powder with a lubricant such as graphite and compressing the mixture into pellet form using a pellet press. The pellets are then calcined in an air stream at 600° to 900° C. to oxidize carbon present and to remove it in the form of carbon dioxide and, if necessary, to activate the alumina.

Useful alumina carriers can also be prepared by forming an alumina sol which is then converted into alumina spheres by dropping the sol into hot oil using the procedure disclosed in U.S. Pat. 2,680,099, Hockstra, issued June 1, 1954.

Another method of preparing a useful alumina carrier is to form an alumina gel. The gel can be prepared from aluminum sulfate and sodium aluminate, or from aluminum nitrate and ammonia, or sodium aluminate and an acid such as hydrochloric acid. Other combinations, which will precipitate alumina, can be used. The precipitate is thoroughly washed. It can then be dried, broken into granules and then calcined, or it can be dried, pelletized and calcined. Or the water can be partially removed from the precipitate and then the precipitate extruded, dried and calcined.

Any suitable alpha alumina monohydrate or activated alumina can be formed into granules or spheres by spraying a suitable binder onto the alumina powder as it is tumbled on a rotating pan or in a rotating drum, or twin shell blender. The resulting alumina particles are then dried and calcined at 400° to 600° C. Any type of furance can be used for calcining the alumina carrier such as a gas fired or electric furance. The carrier may be calcined in air, in a special atmosphere or in steam.

An important feature of the alumina carrier or substrate is that it be in an activated form and that it be relatively pure. Silica and phosphorus should not be present in more than minor or trace amounts.

Any soluble copper, cerium and chromium compound can be used in the preparation of solutions of these compounds for application to the alumina carrier so long as the particular compound used can be decomposed to its oxide by heating. Useful copper compounds include copper chlorides, copper nitrates, copper ammonium carbonate, organic copper salts such as cupric acetate, formates and citrates and the like. Useful cerium compounds include cerous nitrate, cerium hydrate, rare earth carbonates, cerium ammonium nitrate, bastnasite, cerium oxide, cerium carbonate, cerium chloride, and the like. Useful chromium compounds include chromium nitrate, chromic acid, ammonium chromate, and the like. These metal salts can be deposited onto the carrier from an aqueous or nonaqueous solution.

Metal salts are applied by soaking the support in the metal salt solution or by spraying the metal salt solution on the support. The support is then dried and heated at a temperature sufficient to convert the metal salt to its oxide.

Reference may also be made to the examples for a fuller understanding of this invention. The examples are given merely to illustrate the invention and are not to be construed in a limiting sense. All percentages, quantities, parts and proportions are by weight and all temperatures are ° C. unless otherwise indicated.

Example 1

Alpha alumina monohydrate powder (boehmite) is used to prepare a catalyst support. This alumina has an ultimate crystallite size of 37 angstroms as measured by X-ray diffraction using the 020 reflection. It has a typical composition of 75% $Al_2O_3$, 25% loss on ignition and contains the following impurities:

|  | Percent by wt. |
|---|---|
| C | 0.3 |
| $SiO_2$ | 0.008 |
| $Fe_2O_3$ | 0.005 |
| $Na_2O$ | 0.004 |
| S | 0.01 |

This alumina can be converted to a transition alumina by heating to at least 480° C. for a minimum of 3 hours. In the transition form, it has a surface area of about 250 m.$^2$/g. and an ultimate crystallite size of 50 angstroms.

Five pounds of the alumina powder are charged to a Hobart mixer. Then, 1150 ml. of water mixed with 22.5 ml. of concentrated nitric acid is slowly added to the powder while stirring. Mixing is continued for 5 minutes after all the solution has been added. The damp powder is transferred to an extruder and extruded through 2 mm. diameter holes. The extrudate is transferred to a "Marumerizer" where it is converted into spheres. These spheres are dried for 16 hours at 95° C. and then calcined for 4 hours at 600° C.

Solutions for depositing the desired metal oxide are prepared from high purity cupric nitrate, chromium nitrate, and cerium ammonium nitrate crystals, respectively. The spheres are soaked in the appropriate metal nitrate solution of the desired concentration for 30 minutes. They are then drained free of solution and dried at 80° to 95° C. for 2 hours. After the first and second application, the dried spheres are calcined at 400° C. for 2 hours. After the third application, they are calcined for 4 hours at 600° C.

After preparation of the catalyst, it is evaluated in a test apparatus using a synthetic gas mixture to simulate the exhaust of an automobile. The gas mixture has the following composition:

|  | At temperatures of— | |
|---|---|---|
|  | 250° C. | 300° C. |
| Composition, percent: | | |
| Carbon monoxide | 1.5 | 1.0 |
| Propylene | 0.2 | 0.2 |
| Water | 4.0 | 4.0 |
| Carbon dioxide | 4.0 | 4.0 |
| Nitrogen | 78.5 | 80.8 |
| Air | 11.8 | 10.0 |

The gas mixture is passed through the catalyst bed (which was held at the indicated temperature) at a space velocity of 30,000 catalyst bed volumes per hour. The catalyst bed is 5 inches long and is contained in a stainless steel tube having a ⅜" O.D. and a 0.035" wall. The gas mixture is analyzed by vapor phase chromatography before and after passing through the catalyst bed.

In the table below, activity of the catalyst is indicated by the percentage of reduction of the carbon monoxide and propylene in the gas mixture after passing through the catalyst bed. Total activity is simply the sum of these percentages at the two indicated temperatures. The concentration of the solution applied and the order of application are also indicated in the following table.

| Sample number: | Molar concentration and order of application | | | Percent reduction | | | | |
|---|---|---|---|---|---|---|---|---|
| | 1st | 2d | 3d | Total | 250° C. | | 300° C. | |
| | | | | | CO | Pr | CO | P |
| A | 2M-Cr | 1.6M-Ce | 3M-Cu | 227 | 66 | 19 | 93 | 49 |
| B | 3M-Cu | 1.6M-Ce | 2M-Cr | 259 | 80 | 28 | 95 | 56 |
| C | 1.6M-Ce | 3M-Cu | 2M-Cr | 182 | 42 | 11 | 81 | 48 |
| D | 1.6M-Ce | 2M-Cr | 3M-Cu | 179 | 41 | 10 | 81 | 47 |
| E | 1M-Cr | 1M-Ce | 2M-Cu | 236 | 61 | 23 | 93 | 59 |
| F | 2M-Cu | 1M-Ce | 1M-Cr | 257 | 73 | 30 | 94 | 60 |
| G | 1M-Ce | 2M-Cu | 1M-Cr | 204 | 50 | 15 | 87 | 52 |

Cerium applied as a second or middle layer results in higher catalytic activity than when applied as the initial layer.

Example 2

A catalyst is prepared using a spherical gamma-alumina support. Nominal size of the support is minus 5 mesh plus 8 mesh (U.S. Standard Sieve sizes). The support has a specific surface area of 320 sq. meters/g. and a total pore volume of 0.92 cc./g. This alumina support has a maximum impurity level of:

|  | Percent by wt. |
|---|---|
| Fe | 0.02 |
| SiO$_2$ | 0.15 |
| Na | 0.02 |
| Cl | 0.05 |

It has a crushing strength of 17.3 lbs. and a bulk density of 30.9 lb./ft.$^3$.

The support is calcined at 900° C. for 4 hours. Metal nitrate solution described in Example 1 are used for depositing the desired oxide. After application of the first solution, the support is dried for 3 hours at 95° C. and calcined for 2 hours at 600° C. The second layer is applied; the samples dried overnight at 95° C., and then calcined for 2 hours at 600° C. The third layer is applied; the catalyst dried for 3 hours at 95° C. and then calcined at 900° C. for 4 hours. Soaking time in each solution is 45 minutes.

The catalysts are tested as described in Example 1.

| Sample number: | Molar concentration and order of application | | | Percent reduction | | | | |
|---|---|---|---|---|---|---|---|---|
| | 1st | 2d | 3d | Total | 250° C. | | 300° C. | |
| | | | | | CO | Pr | CO | Pr |
| A | 2M-Cu | 1M-Ce | 1M-Cr | 238 | 69 | 21 | 95 | 53 |
| B | 2M-Cu | 0.5M-Ce | 0.5M-Cr | 247 | 77 | 22 | 97 | 51 |

It should be noted that these results and those in Example 1 where the ratio of Cu to Cr is greater than 1 and the cerium has been applied as the second coating are higher in activity than that obtained in Example 4 where the Cu/Cr ratio is 1.

Example 3

A support similar to that described in Example 2 but having a specific surface area of 343 sq. meters/g. and a total porosity of 0.99 cc./g. is calcined at 900° C. for 4 hours. High purity copper nitrate is used as a source of copper. Cerous nitrate (99.9% pure) mixed with reagent grade ammonium glycolate in a 1:1.5 mole ratio is used as a source of cerium and reagent grade ammonium chromate is used as a source of chromium.

After soaking the support in the desired metal solution, it is dried and fired at 400° C. for 2 hours. The final layer is fired at 900° C. for 4 hours. The order of application is Cu-Ce-Cr.

The catalysts are tested as described in Example 1.

| Sample No. | Molar concentration | | | Percent reduction | | | | |
|---|---|---|---|---|---|---|---|---|
| | Cu | Ce | Cr | Total | 250° C. | | 300° C. | |
| | | | | | CO | Pr | CO | Pr |
| A | 0.9 | 0.2 | 0.3 | 164 | 30 | 10 | 81 | 43 |
| B | 0.9 | 0.2 | 0.6 | 148 | 26 | 8 | 75 | 39 |
| C | 2.4 | 0.3 | 0.2 | 165 | 40 | 9 | 77 | 39 |
| D | 2.4 | 0.3 | 0.6 | 165 | 33 | 11 | 78 | 43 |
| E | 2.6 | 0.3 | 0.6 | 161 | 29 | 6 | 81 | 45 |
| F | 2.6 | 0.5 | 0.6 | 182 | 36 | 11 | 82 | 53 |
| G | 1.1 | 0.6 | 1.0 | 197 | 50 | 20 | 79 | 48 |

These results show that a minimum concentration of 0.5 molar cerium is required for good activity.

Example 4

A dilute solution of nitric acid (1.4 w/o) is added to the alumina powder described in Example 1. The powder is mixed with the nitric acid solution in a 1:0.65 ratio on a weight to volume basis. Spheres approximately ⅛" in diameter are prepared, dried for 4 hours at 95° C. and calcined at 600° C. for 4 hours.

Metal nitrate solutions are applied in the order and at the concentrations indicated in the table below. The spheres are soaked in each metal nitrate solution indicated for 45 minutes. They are then dried for 3-4 hours at 90° to 95° C., followed by calcining at 600° C. for 4 hours. After the final metal nitrate application and drying, the samples are calcined at 900° C. for 4 hours. The effect of different concentrations of the various elements on the catalytic activity are shown below.

| Sample No. | Molar concentrations, order of application | | | Percent reduction | | | | |
|---|---|---|---|---|---|---|---|---|
| | 1st | 2d | 3d | Total | 250° C. | | 300° C. | |
| | | | | | CO | Pr | CO | Pr |
| A | 2 Cr | 1.6 Ce | 2 Cu | 208 | 45 | 16 | 90 | 57 |
| B | 2 Cr | 1.0 Ce | 2 Cu | 218 | 44 | 20 | 92 | 62 |
| C | 1 Cr | 1.0 Ce | 1 Cu | 211 | 49 | 17 | 88 | 57 |
| D | 2 Cu | 0 Ce | 2 Cu | 131 | 15 | 7 | 62 | 47 |
| E | 2 Cr | 0 Ce | 2 Cu | 147 | 17 | 9 | 68 | 53 |

Example 5

The spherical substrate described in Example 1 is soaked in the metal nitrate solutions in the order and concentrations indicated below. The substrate is soaked in the first solution for 45 minutes, dried overnight at 95° C. and calcined at 600° C. for 2 hours. After application of the second solution, the catalyst is dried overnight at 95° C. and then calcined at 600° C. for 4 hours. After application of the third solution, the catalyst is dried at 95° C. for 4 hours and calcined at 900° C. for 4 hours. The effect of the concentration of cerium on activity is shown below. The order of application for each sample is Cr-Ce-Cu.

| Sample No. | Molar concentrations, order of application | | | Percent reduction | | | | |
|---|---|---|---|---|---|---|---|---|
| | | | | | 250° C. | | 300° C. | |
| | Cr | Ce | Cu | Total | CO | Pr | CO | Pr |
| A | 2 | 1.0 | 2 | 200 | 44 | 15 | 88 | 53 |
| B | 2 | 0.5 | 2 | 178 | 34 | 13 | 79 | 52 |
| C | 2 | 0.25 | 2 | 150 | 24 | 11 | 69 | 46 |

Example 6

The object of this experiment is to determine whether other sources of cerium or mixed lanthanides can be used as a substitute for ceric ammonium nitrate. The other sources are:

(a) cerous nitrate—99.9% $Ce(NO_3)\cdot 6H_2O$
(b) cerium hydrate—79% $CeO_2$
(c) rare earth carbonates—70% $ReO_2$ containing 48% $CeO_2$ These compounds are dissolved in water or nitric acid as required to give the concentrations shown below.

The substrates shown below are soaked in 3 M copper nitrate for 45 minutes, dried for 3 to 4 hours at 97° C. and calcined for 4 hours at 600° C. They are then soaked in the indicated cerium or lanthanide solution, dried and calcined as above. As a final coating, the catalyst is soaked in 2 M chromic acid solution for 45 minutes, dried at 97° C. for 4 hours and then calcined at 900° C. for 4 hours. The activity of these catalysts are shown below:

salt to an alumina support and then calcining the metal salt to form a metal oxide layer on the carrier; thereafter (2) applying a solution of a cerium salt to the support and then calcining the cerium salt to form a cerium oxide layer on the carrier; and thereafter (3) applying a solution of a metal salt selected from the group consisting of a copper salt and a chromium salt to the support and then calcining the metal salt to form a metal oxide layer on the support wherein the molar concentration of the copper salt solution is from about 1 to about 3, the molar concentration of the cerium salt solution is from about 0.5 to about 2 and the concentration of the chromium salt solution is from about 0.2 to about 3 with the proviso that when the copper salt solution is applied in step (1), a chromium salt solution is applied in step (3) and when a chromium salt solution is applied in step (1), a copper salt solution is applied in step (3).

2. The catalyst of claim 1 wherein the copper salt solution is applied in step (1) of the process and the chromium salt solution is applied in step (3) of the process.

3. The catalyst of claim 1 wherein the chromium salt solution is applied in step (1) of the process and the copper salt solution is applied in step (3) of the process.

| Sample number | Substrate | Cerium | | Percent reduction | | | | |
|---|---|---|---|---|---|---|---|---|
| | | Source | Concentration | Total | 250° C. | | 300° C. | |
| | | | | | CO | Pr | CO | Pr |
| A | Example 1 | Nitrate | 1.6 M | 201 | 35 | 14 | 96 | 56 |
| B | do | Carbonate | 1.6 M | 176 | 34 | 5 | 96 | 41 |
| C | do | do | 0.8 M | 217 | 39 | 17 | 97 | 64 |
| D | do | Hydrate | 1.6 M | 199 | 39 | 15 | 96 | 49 |
| E | Example 3 but calcined at 600° C. | Nitrate | 1.6 M | 141 | 20 | 11 | 69 | 41 |
| F | do | Carbonate | 0.8 M | 107 | 18 | 4 | 56 | 25 |
| G | Example 3 | Nitrate | 1.6 M | 177 | 38 | 10 | 82 | 47 |
| H | do | Carbonate | 1.6 M | 93 | 14 | 2 | 56 | 21 |

It is to be understood that although the invention has been described with specific reference to particular embodiments thereof, it is not to be so limited, since changes and alterations therein may be made which are within the full intended scope of this invention as defined by the appended claims.

What is claimed is:

1. A copper oxide-cerium oxide-chromium oxide catalyst for oxidation of hydrocarbons and carbon monoxide in exhaust gases from internal combustion engines produced by an improved process, the improvement in the process consisting essentially of (1) applying a solution of a metal salt selected from the group consisting of a copper salt and a chromium

References Cited
UNITED STATES PATENTS

| 3,322,491 | 5/1967 | Barrett et al. | 252—462 X |
| 3,679,768 | 7/1972 | Kmecak et al. | 252—462 X |
| 3,542,897 | 11/1970 | Wattimena et al. | 252—462 X |
| 3,353,916 | 11/1967 | Lester | 252—462 X |
| 3,284,370 | 11/1966 | Clifford et al. | 252—462 |
| 2,785,210 | 3/1957 | Schmetterling et al. | 252—462 X |
| 2,402,854 | 6/1946 | Thomas | 252—462 X |

DANIEL E. WYMAN, Primary Examiner

P. F. SHAVER, Assistant Examiner

U.S. Cl. X.R.

423—213